Patented Apr. 16, 1935

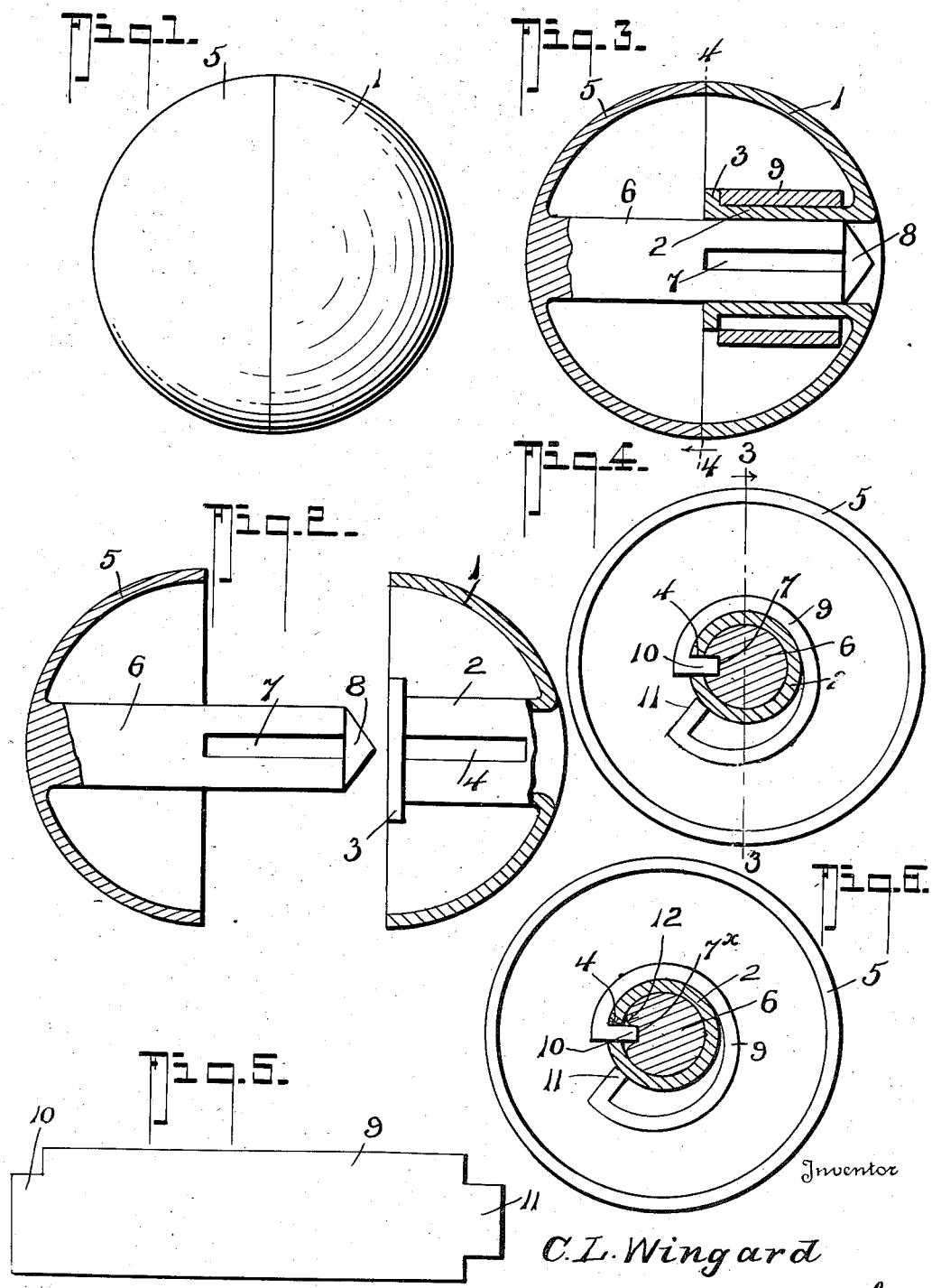

1,997,958

UNITED STATES PATENT OFFICE 1,997,958

MEANS FOR HOLDING TOGETHER PARTS HAVING TELESCOPIC ENGAGEMENT

Charles Leo Wingard, Portland, Oreg.

Application March 6, 1933, Serial No. 659,897

2 Claims. (Cl. 85—5)

My invention relates to means for securing together two hemispherical parts which have a telescopic or male and female engagement with one another for the purpose of preventing these parts from being separated or pulled apart under conditions of use, and/or from rotating one with respect to the other on their joint axis.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is an elevation of a two-part sphere embodying the invention.

Figure 2 is a central vertical longitudinal section and part elevation of the invention, the male and female parts being shown separated and the spring band omitted.

Figure 3 is a central longitudinal vertical section on the line 3—3 of Figure 4.

Figure 4 is a cross section on the line 4—4 of Figure 3.

Figure 5 is a developed view of the spring band.

Figure 6 is a detail cross section similar to Figure 4 showing a modification.

In the drawing, in which like numerals of reference indicate like parts in all of the figures, 1 and 5 represent the hemispherical members, the member 1 having the tubular hub 2, and the member 5 having the pin or spindle 6. The hub has a slot 4 to receive one or the other of the ribs or keys 10 and 11 of the spring band 9.

The spindle 6 has a straight walled slot 7 when a permanent joint is to be made, or it may be constructed in cross section as shown in Figure 6, when a releasable joint is desired.

The end of the spindle is tapered as at 8 so as to enter the hub 2 easily and the hub 2 has a flange 3 for retaining the spring band 9 against being pulled off.

In the modification of Figure 6 the slot 7x has its sides rounded as at 12 so upon rotation of the two parts 1 and 5 the spring may be released for separation of the two parts by a pull in the direction of their axes.

The invention may be used in securing the two parts of a geographic globe together; for securing two parts of a spherical hand grenade together; or, in fact, any two hemispherical hollow bodies regardless of the use to which they may be put.

From the foregoing description, taken in connection with the accompanying drawing, it is thought the complete construction, operation and advantages of my invention will be readily understood by those skilled in the art.

What I claim is:

1. A pair of hemispherical bodies, one having an internal tubular hub and the other having an internal spindle adapted, when said bodies are brought together, to enter and be received by said hub as a male and female joint, and means within said body operating upon the male and female joint being made to lock the bodies together, said last named means comprising registering slots in the male and female elements, and a spring pressed locking member carried by said female member and having an end projecting into said slots to engage with both the male and female members.

2. A pair of hemispherical bodies, one having an internal tubular hub and the other having an internal spindle adapted, when said bodies are brought together, to enter and be received by said hub as a male and female joint, and means within said body operating upon the male and female joint being made to lock the bodies together, said last named means comprising registering slots in the male and female elements, and a spring pressed locking member held in said slots, the spindle having its longitudinal walls curved in its slot whereby upon rotating the pair of bodies on their common axis they may be unlocked.

CHARLES LEO WINGARD.